United States Patent
Zhan et al.

(10) Patent No.: US 8,617,274 B2
(45) Date of Patent: Dec. 31, 2013

(54) PULSED ELECTRICAL FIELD ASSISTED OR SPARK PLASMA SINTERED POLYCRYSTALLINE ULTRA HARD MATERIAL AND THERMALLY STABLE ULTRA HARD MATERIAL CUTTING ELEMENTS AND COMPACTS AND METHODS OF FORMING THE SAME

(75) Inventors: Guodong Zhan, Spring, TX (US); Youhe Zhang, Spring, TX (US); Yuelin Shen, Houston, TX (US)

(73) Assignee: Smith International, Inc., Houston, TX (US)

( * ) Notice: Subject to any disclaimer, the term of this patent is extended or adjusted under 35 U.S.C. 154(b) by 530 days.

(21) Appl. No.: 12/499,712

(22) Filed: Jul. 8, 2009

(65) Prior Publication Data

US 2010/0005729 A1     Jan. 14, 2010

Related U.S. Application Data

(60) Provisional application No. 61/134,376, filed on Jul. 8, 2008.

(51) Int. Cl.
*B24D 3/02* (2006.01)
*C09C 1/68* (2006.01)
*C09K 3/14* (2006.01)

(52) U.S. Cl.
USPC ............... 51/309; 51/307; 175/434; 264/460

(58) Field of Classification Search
USPC .................................. 51/307, 309
See application file for complete search history.

(56) References Cited

U.S. PATENT DOCUMENTS

| 3,250,892 A | * | 5/1966 | Inoue | 219/149 |
| 3,745,623 A | | 7/1973 | Wentorf, Jr. et al. | |
| 3,949,062 A | * | 4/1976 | Vereschagin et al. | 423/446 |

(Continued)

FOREIGN PATENT DOCUMENTS

| DE | 198 45 151 A1 | 4/2000 | |
| GB | 2201425 A | * 9/1988 | B22F 3/12 |

(Continued)

OTHER PUBLICATIONS

Khor, K. A. et. al., "Post-Spray Treatment of Plasma Sprayed Yttria Stabilized Zirconia (YSZ) Electrolyte with Spark Plasma Sintering (SPS) Technique", May 10-12, 2004, ITSC 2004 International Thermal Spray Conference 2004: Advances in Technology and Application; Osaka, Japan; pp. 27-31.*

(Continued)

*Primary Examiner* — Kaj K Olsen
*Assistant Examiner* — Ross J Christie
(74) *Attorney, Agent, or Firm* — Christie, Parker & Hale, LLP

(57) ABSTRACT

The present invention relates to ultra-hard cutting elements, and in particular cutting elements or compacts formed by a pulsed electrical field assisted HPHT sintering process or a spark plasma HPHT sintering process. In an embodiment, a method of forming a polycrystalline ultra-hard material includes providing a mixture of ultra-hard particles, placing the mixture of ultra-hard particles into an enclosure, placing the enclosure into a press cell assembly having a heater, applying a repeated high-energy pulse of direct current to the heater to heat the ultra-hard particles, and pressing the enclosure at sufficient pressure to form a polycrystalline ultra-hard material.

23 Claims, 3 Drawing Sheets

(56) References Cited

U.S. PATENT DOCUMENTS

| | | | |
|---|---|---|---|
| 4,097,274 A | | 6/1978 | Bakul et al. |
| 4,188,194 A | * | 2/1980 | Corrigan ................. 51/307 |
| 4,505,746 A | * | 3/1985 | Nakai et al. ............. 75/243 |
| 4,525,179 A | * | 6/1985 | Gigl ........................ 51/309 |
| 5,127,923 A | | 7/1992 | Bunting et al. |
| 5,158,148 A | * | 10/1992 | Keshavan ............... 175/426 |
| 5,169,572 A | | 12/1992 | Matthews |
| 5,271,749 A | * | 12/1993 | Rai et al. ................. 51/293 |
| 5,718,736 A | * | 2/1998 | Onishi et al. ............ 51/307 |
| 5,848,348 A | | 12/1998 | Dennis |
| 5,889,219 A | * | 3/1999 | Moriguchi et al. ....... 75/236 |
| 6,004,505 A | | 12/1999 | Roy et al. |
| 6,346,689 B1 | | 2/2002 | Willis et al. |
| 6,485,533 B1 | * | 11/2002 | Ishizaki et al. .......... 51/307 |
| 6,858,173 B2 | * | 2/2005 | Zhan et al. .............. 264/430 |
| 6,875,374 B1 | * | 4/2005 | Zhan et al. .............. 252/502 |
| 6,905,649 B2 | * | 6/2005 | Zhan et al. .............. 264/434 |
| 6,976,532 B2 | * | 12/2005 | Zhan et al. .............. 165/185 |
| 7,148,480 B2 | * | 12/2006 | Zhan et al. .............. 250/338.1 |
| 2003/0134135 A1 | | 7/2003 | Noda |
| 2004/0150140 A1 | * | 8/2004 | Zhan et al. .............. 264/430 |
| 2004/0167009 A1 | * | 8/2004 | Kuntz et al. ............. 501/95.2 |
| 2004/0201137 A1 | * | 10/2004 | Zhan et al. .............. 264/434 |
| 2004/0261978 A1 | * | 12/2004 | Zhan et al. .............. 165/104.11 |
| 2005/0067607 A1 | * | 3/2005 | Zhan et al. .............. 252/502 |
| 2005/0133963 A1 | * | 6/2005 | Zhan et al. .............. 264/434 |
| 2005/0173840 A1 | * | 8/2005 | Wan et al. ................ 264/449 |
| 2005/0245386 A1 | * | 11/2005 | Zhan et al. .............. 501/95.1 |
| 2006/0011839 A1 | * | 1/2006 | Zhan et al. .............. 250/338.1 |
| 2008/0014444 A1 | | 1/2008 | Reineke |
| 2008/0073127 A1 | | 3/2008 | Zhan et al. |
| 2008/0314568 A1 | * | 12/2008 | Zhan et al. .............. 165/135 |
| 2010/0005728 A1 | * | 1/2010 | Bellin ....................... 51/309 |
| 2010/0005729 A1 | * | 1/2010 | Zhan et al. ............... 51/309 |
| 2010/0294571 A1 | * | 11/2010 | Belnap et al. ........... 175/434 |

FOREIGN PATENT DOCUMENTS

| | | | | |
|---|---|---|---|---|
| JP | 56128612 A | * | 10/1981 | ............ B21C 3/02 |
| JP | 2002 069560 A | | 3/2002 | |
| JP | 2002 220628 A | | 8/2002 | |
| WO | WO 2004077521 A2 | * | 9/2004 | |
| WO | WO 2006/027675 A1 | | 3/2006 | |

OTHER PUBLICATIONS

Hungria, Teresa et al., "Grain Growth Control in NaNbO3—SrTiO3 Ceramics by Mechanosynthesis and Spark Plasma Sintering", J. Am. Ceram. Soc., 90 [7] 2122-2127 (first published online Jun. 6, 2007).*

J.R. Groza and A. Zavaliangos, *Nanostructured Bulk Solids by Field Activated Sintering* (Journal), Jun. 23, 2003, 10 Pages, Advanced Study Center Co. Ltd., Davis CA and Philadelphia, PA, USA.

L. Girardini, M. Zadra, F. Casari and A. Molinari, *WC-Co Consolidation by Means of Spark Plasma Sintering* (Journal), Oct. 23-25, 2006, 19 Pages, University of Trento, Dept. of Materials Engineering and Industrial Technologies, Italy.

SPS Syntex Inc., What's SPS, *Principles and Mechanism of the SPS Process*, Website, <http://www.scm-sps.com/e_htm/whatsps_e_htm/whatsps4_e.htm>, Apr. 24, 2008, 3 Pages, Kanagawa, Japan.

The International Search Report and the Written Opinion of the International Searching Authority, or the Declaration, dated Feb. 17, 2010, for International Application No. PCT/US2009/049958, Filed Jul. 8, 2009.

Casari, Francesco et al.; "Design of Layered Metal-Ceramic FGMs Produced by Spark Plasma Sintering"; Multiscale and Functionally Graded Materials; AIP Conference Proceedings; vol. 973; 2006; pp. 832-837.

Girardini, L. et al.; "Bulk fine grained and nanostructured binderless WC consolidated by Spark Plasma Sintering"; Proceeding Euro PM2007; Tolouse, France; Oct. 17-19, 2007; 7pp.

Extended Supplementary European Search Report dated Jun. 27, 2012, for Application No. EP 09 79 5132; 8 Pages.

Miyamoto, Yoshinari et al.; *Fabrication of New Cemented Carbide Containing Diamond Coated with Nanometer-Sozed SiC Particles*; Journal of the American Ceramic Society; Malden, MA, USA; vol. 86, No. 1, pp. 73-76; Jan. 1, 2003; 4 Pages.

Sang Yoo et al.; Scripts Materials, *Diffusion Bonding of Boron Nitride on Metal Substrates by Plasma Activated Sintering (Pas) Process*; Department of Chemical Engineering and Materials Science, Department of Mechanical Engineering; University of California, Davis; vol. 34, No. 9, pp. 1383-1386; May 1, 1996; 4 Pages.

R. Holke et al.; *Sintering of Diamond-Cemented Carbide-Composites*; Fraunhofer Institute Ceramic Technologies and Systems (IKTS) Dresden; Luxembourg; pp. 167-171 (6 Pages).

* cited by examiner

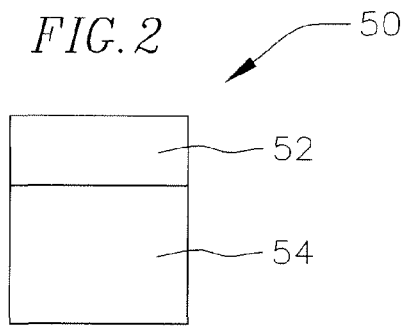
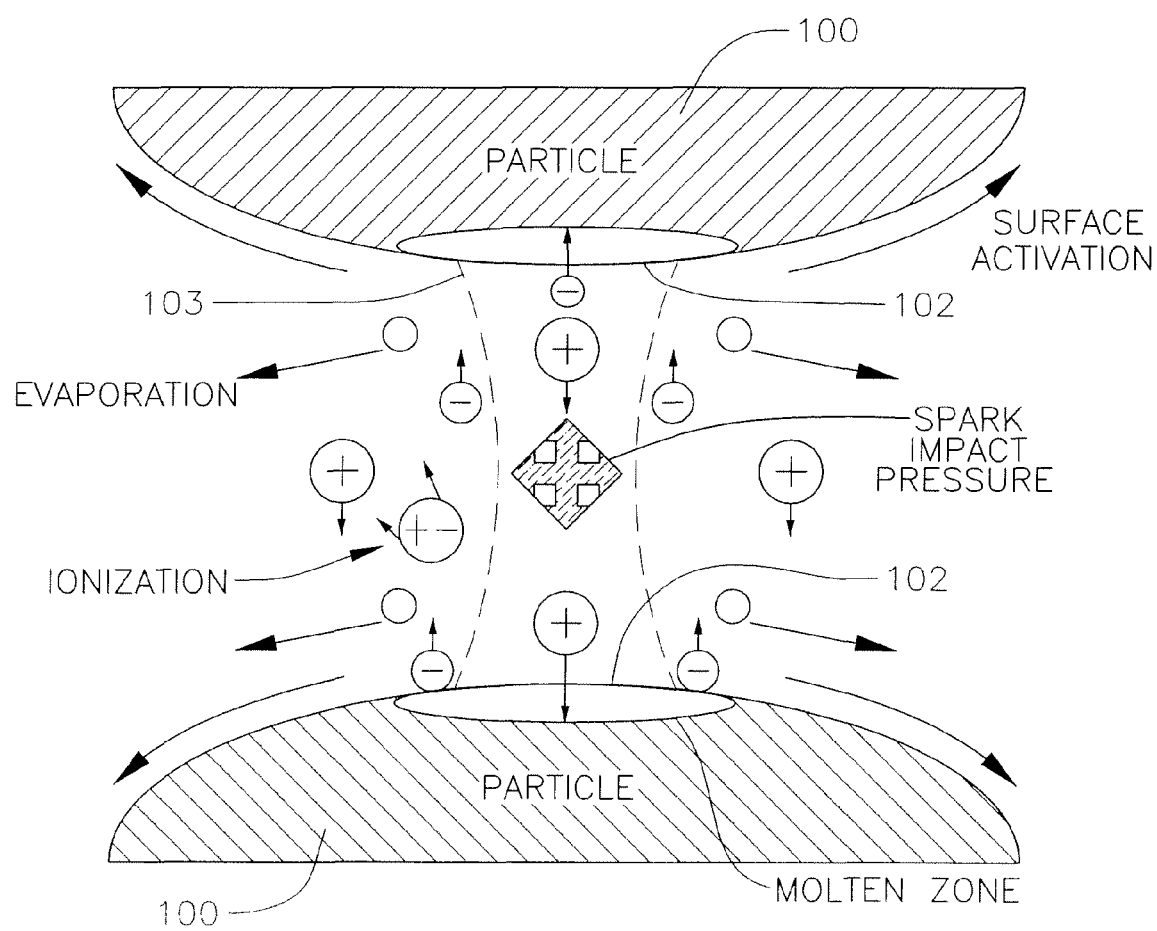

PULSED ELECTRICAL FIELD ASSISTED OR SPARK PLASMA SINTERED POLYCRYSTALLINE ULTRA HARD MATERIAL AND THERMALLY STABLE ULTRA HARD MATERIAL CUTTING ELEMENTS AND COMPACTS AND METHODS OF FORMING THE SAME

CROSS-REFERENCE TO RELATED APPLICATION

This application claims the benefit of and priority to U.S. Provisional Application No. 61/134,376, filed on Jul. 8, 2008, the contents of which are fully incorporated herein by reference.

BACKGROUND OF THE INVENTION

Polycrystalline ultra hard material cutting elements include an ultra-hard cutting layer, such as polycrystalline diamond ("PCD"), polycrystalline cubic boron nitride ("PCBN") or thermally stable polycrystalline ultra hard material ("TSP"), formed over a substrate such as a cemented tungsten carbide substrate. The substrate is typically a body of cemented tungsten carbide with the tungsten carbide particles cemented together with cobalt. Such cutting elements have well-known applications in the industry.

Many commercially available polycrystalline ultra hard cutting elements, such as PCD cutting elements, are formed in accordance with the teachings of U.S. Pat. No. 3,745,623, the contents of which are fully incorporated herein by reference, whereby a relatively small volume of ultra hard particles is sintered in a thin layer of approximately 0.5 to 1.3 mm onto a cemented tungsten carbide substrate. While the teachings of U.S. Pat. No. 3,745,623 utilize a belt press in the disclosed sintering process, it is also known that a cubic press or a Piston-Cylinder (PC) press may also be used.

Generally speaking, the process for making an ultra hard cutting element includes placing the carbide substrate adjacent a layer of ultra hard material particles, as for example diamond, and subjecting the substrate and the ultra hard layer to high temperature and high pressure conditions where diamond is thermodynamically stable. These temperatures are in the range of 1300°-1600° C. and the pressures are in the range of 5.5 GPa. This process is also known as a high pressure, high temperature "HPHT" sintering process. This process results in re-crystallization and the formation of a polycrystalline ultra hard material layer on the surface of the tungsten carbide substrate.

When the ultra hard material layer is a PCD layer, the layer may include tungsten carbide particles and/or small amounts of cobalt. The cobalt particles may be mixed with the diamond particles prior to sintering, and/or may infiltrate the diamond layer from the cemented tungsten carbide substrate during sintering. Cobalt is used as a catalyst material to promote the formation of polycrystalline diamond during the HPHT sintering process.

After sintering, the PCD layer has a structure of individual diamond crystals that are interconnected to define a lattice structure. Cobalt particles from the pre-sintered diamond mixture and/or from the substrate are often found within the interstitial spaces in the diamond lattice structure, between the bonded diamond crystals. However, cobalt has a significantly different coefficient of thermal expansion as compared to diamond. Heating of the polycrystalline diamond, such as by frictional heating during operation of the cutting element, causes the cobalt to expand more than the diamond. This relative expansion can cause cracks to form in the diamond lattice structure, resulting in the deterioration of the PCD layer. TSP can be created by removing the cobalt from the diamond lattice structure, such as by leaching. After leaching, the TSP layer becomes more heat resistant. However, the TSP layer also becomes more brittle. Accordingly, in certain cases, only a select portion, measured in depth and/or width, of the PCD layer is leached to form TSP, in order to gain thermal stability without losing impact resistance.

TSP material may also be formed by forming polycrystalline diamond with a thermally compatible silicon carbide binder instead of cobalt. "TSP" as used herein refers to either of the aforementioned types of TSP materials. Use of TSP cutting layers in cutting elements is described in U.S. Pat. No. 7,234,550 and in application Ser. No. 10/967,584 filed on Oct. 18, 2004, which are fully incorporated herein by reference.

The current methods of forming ultra hard material cutting elements generate significant residual stresses at the interface between the ultra had material layer and the substrate. These stresses are caused by the mismatch between the coefficient of thermal expansion of the ultra hard material layer and that of the substrate. The higher the heat that the ultra hard material and the substrate are exposed to during sintering, the higher the residual stresses, as the relative expansion of the ultra hard material and the substrate is exaggerated by the higher heat.

SUMMARY OF THE INVENTION

In an exemplary embodiment, a cutting element or compact is formed by a pulsed electrical field assisted HPHT sintering process or a spark plasma HPHT sintering process. In both of these processes, sintering is accomplished and a polycrystalline ultra-hard layer is formed at a lower temperature than the temperatures reached during conventional HPHT sintering processes. As a result, there is less relative expansion between the ultra-hard particles and the cobalt binder, due to their different coefficients of thermal expansion, and the residual stresses in the sintered polycrystalline layer are reduced. This reduction in residual stresses leads to fewer cracks forming between the cobalt binder and the ultra-hard particles in the sintered layer. Thus, exemplary cutting elements formed with these processes have longer operating lives and improved performance.

In one embodiment, a method of forming a polycrystalline ultra-hard material includes providing a mixture of ultra-hard particles, placing the mixture of ultra-hard particles into an enclosure, placing the enclosure into a press cell assembly having a heater, applying a repeated high-energy pulse of direct current to the heater to heat the ultra-hard particles, and pressing the enclosure at sufficient pressure to form a polycrystalline ultra-hard material.

BRIEF DESCRIPTION OF THE DRAWINGS

FIG. 2 is a plan view of an exemplary embodiment cutting element of the present invention.

FIG. 3 depicts an illustrative view of the effects spark plasma sintering on two ultra hard material particles during the formation of an exemplary embodiment ultra hard material.

DETAILED DESCRIPTION OF THE INVENTION

In an exemplary embodiment, a cutting element or compact is formed by a pulsed electrical field assisted HPHT sintering process or a spark plasma HPHT sintering process. In both of these processes, sintering is accomplished and a polycrystalline ultra-hard layer is formed at a lower temperature than the temperatures reached during conventional HPHT sintering processes. As a result, there is less relative expansion between the ultra-hard particles and the cobalt binder, due to their different coefficients of thermal expansion, and the residual stresses in the sintered polycrystalline ultra-hard layer or at the interface between the ultra-hard layer and the substrate are reduced. This reduction in residual stresses leads to fewer cracks forming between the cobalt binder and the ultra-hard particles in the sintered layer. Thus, exemplary cutting elements formed with these processes have longer operating lives and improved performance.

Figure 1:
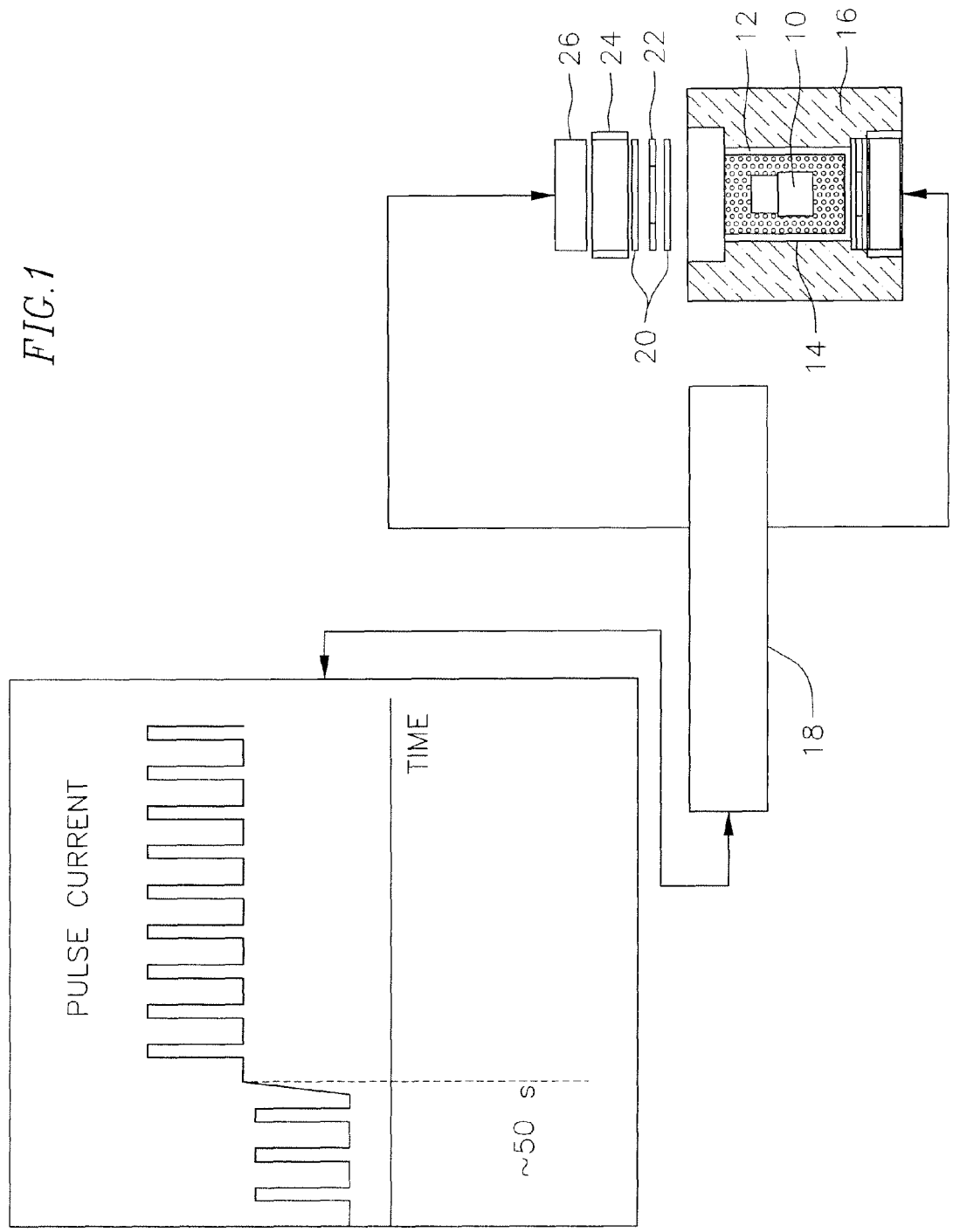
FIG. 1 depicts a schematic of an exemplary embodiment spark plasma sintering system used to form an exemplary embodiment ultra hard material.

For both processes, pulsed electrical field assisted HPHT sintering and spark plasma HPHT sintering, the ultra hard particles are first arranged in a high pressure press assembly. In an exemplary embodiment, ultra hard material particles such as diamond or cubic boron nitride are placed in a refractory metal enclosure 10, also commonly referred to as a "can" (FIG. 1). The ultra hard material may be in powder form. The powder may have particles which are coated or not coated. For example, a diamond powder may be used having diamond particles that are coated with other materials such as sintering aid materials or binders (such as cobalt or $MnCO_3$) including nanocoatings using various known methods. Exemplary methods include Atomic Layer Deposition (ALD) or Chemical Vapor Deposition (CVD) methods. Alternatively, the diamond powder mixture may contain no additional binder materials. A substrate material such as a cemented tungsten carbide material is placed over the layer of ultra hard material particles. The can is covered with a cover also made from the same material as the can. An exemplary refractory metal material used to form the can is niobium. The can is placed in a graphite heater 14. The graphite heater is placed in a gasket material 16.

For spark plasma HPHT sintering, a pulse generator 18, such as a direct current ("DC") pulse generator, is used to pulse high amperage direct current to the graphite heater to heat the metal can. In another embodiment, the pulse may be applied as alternating current (AC) rather than DC. The pulse generator 18 is electrically connected to a current ring 24. In an embodiment, the current ring 24 is made from steel. The current ring 24 is electrically connected to the surrounding anvils in the press (not shown), which pass current from the pulse generator 18 to the current ring 24. Current passes from the current ring 24 to two current discs 20, and then to the graphite heater 14. In an embodiment, the current discs 20 are made from steel. A baffle 22 may be placed between the two current discs 20 to act as an electrical insulator, to prevent the two discs from sliding against each other under high pressure. The baffle helps to ensure good electrical contact from the current ring 24 through the discs 20 to the graphite heater 14. Additionally, a synthetic gasketing material ("SGM") 26 is placed above the steel current ring 24 in order to insulate the surrounding high pressure anvils from the very high temperatures inside the assembly. The entire assembly as shown in FIG. 1 is then placed in the pressure cell of a high pressure press such as a belt press, a cubic press, or a PC press.

Current from the pulse generator 18 flows through the steel current ring 24 and through current discs 20 to the graphite heater 14. In one embodiment, the can is surrounded by salt 12 inside the heater 14. The salt acts as an insulator and prevents current from the pulse generator 18 from flowing directly through the can 10 and the ultra-hard material. In another embodiment, the can 10 is surrounded by a conductor, rather than the salt 12. Thus, in FIG. 1, where the salt 12 is shown, a conducting material is provided. In an embodiment, this material is a metal powder, such as a niobium powder. The metal can be the same material used to form the can 10. The metal should have a high melting point. When the can 10 is surrounded by a conductor such as a metal powder, current from the pulse generator 18 passes directly through the conductor, through the can 10, and through the ultra-hard material.

In an exemplary embodiment, the pulse generator generates electric pulses having an amperage in the range of 1 to 10,000 amperes and a voltage of about 5 to 10 volts. The current density, which is taken by dividing the total current by the area of the top surface of the can (perpendicular to the flow of current) is between about 250 $A/cm^2$ and about 10,000 $A/cm^2$. In an exemplary embodiment, the pulse generator pulses in two periods between 0 amperage (no current) and an amperage in the range 1 to 10,000 amperes. Each pulse in an exemplary embodiment lasts for about 3 milliseconds and the time between pulses is about 3 milliseconds. In another exemplary embodiment the pulses are about 2.5 milliseconds in duration, with about 2.5 milliseconds between pulses. Twelve pulse cycles are applied and then no current is applied for two cycles, and then the twelve cycles of pulsing begin again. This creates twelve pulse cycles and then two "off" cycles. This pulse is applied while the entire assembly, including the gasket material, graphite heater, and can enclosure, is subjected to high pressure in the range of 5 to 7 GPa by the high pressure press. The pulse wave shown in FIG. 1 is a rectangular wave, but other pulse waves may be used, such as a triangular pattern (with the current ramping up and back down), a square pattern, or a sinusoidal pattern. Other pulse forms may be used, as for example the pulse forms described in the article entitled "Nanostructured Bulk Solids by Field Activated Sintering," by J. R. Groza and A. Zavaliangos, Review on Advanced Materials Science, Vol. 5 No. 1, pages 24-33 (2003), which is fully incorporated herein by reference. This process is different from a conventional HPHT sintering process where the current supplied to the graphite heater is constant during the heating aspect of the sintering process.

In an exemplary embodiment, the pulsing amperage applied to the graphite heater causes the heater to heat the can enclosure to a temperature in a range of 1050° C. to 1450° C. In another exemplary embodiment, the sintering temperature to which the can and its contents are exposed is maintained below 1300° C., and in another embodiment, below 2000° C. The temperatures may be kept at the low end of these ranges in order to minimize residual stresses. The temperature should be high enough to liquefy the cobalt (present in the ultra hard powder mixture and/or in the substrate) which infiltrates the spaces between the ultra hard particles and acts as a catalyst to assist the intergranular bonding. In another exemplary embodiment, the assembly is subjected to the exemplary sintering pressures and temperatures for a time period of 1 to 30 minutes, or even just a few seconds. This time range includes the temperature rise and holding times. For example, in exemplary embodiments, the temperature rise time is 1-5 minutes, and the holding time is 1-30 minutes. The pulsing takes place during the holding time. Cooling may take an additional 1-2 hours depending various factors such as the maximum temperature reached and the arrangement of the press assembly. Sintering with the inventive process may be accomplished in a shorter time period than with the conventional HPHT sintering process.

After the pulse-assisted sintering, the ultra hard material and substrate are then removed from the pressure cell and the can enclosure to reveal a sintered compact or cutting element 50 having a polycrystalline ultra hard material layer 52 such a PCD or PCBN layer over a substrate 54 (FIG. 2). The PCD layer may be converted to a TSP layer by removing the cobalt from a portion or the entire PCD layer, such as by leaching. The sintered compact shown in FIG. 2 is cylindrical, but other shapes of cutting elements or compacts may also be formed during the inventive process.

In an exemplary embodiment, the applied pulse is a high energy, low voltage spark pulse current that generates a spark plasma at high localized temperatures between the ultra hard material particles 100 in the ultra hard layer. These localized high temperatures may be as high as a few thousand to ten thousand ° C. between the particles. A spark discharge appears in the gaps between the ultra-hard particles, momentarily applying high heat to the surfaces 102 of the particles (FIG. 3). This high localized heat causes vaporization and the melting of the surfaces 102 of the ultra hard material particles, creating a molten zone at the surface 102. This effect can be referred to as surface activation. Repeated pulsing causes this molten zone to form constricted shapes or "necks" 103 around the contact area between particles (shown in dashed lines in FIG. 3). These necks gradually develop and plastic transformation progresses during sintering, causing the ultra hard particles to flow together and fill in the interstitial spaces between the particles. As a result of this plastic deformation, the sintered ultra-hard layer has a density ratio of over 99% (the measured density divided by the theoretical density, theoretical density being determined by volume-averaging the densities of each component, in this case the ultra-hard particles and any binder or catalyst). The high energy pulses are concentrated at the point of intergranular bonding between the ultra hard material particles 100, as the pulses form the spark plasma in the gaps between the particles. As the surfaces melt and flow together, they form intergranular bonds between adjacent ultra hard particles.

The high heat from the pulses also causes evaporation of moisture in the gaps between particles, thereby cleaning impurities from the gaps and facilitating intergranular bonding. The spark plasma that appears between the ultra-hard particles also applies a temporary impact pressure to the particles, which further assists in the melting and flow of the particles.

The high localized temperature caused by the spark plasma results in optimum thermal and electrolytic diffusion. The repeated application of the pulsing to the powder mixture causes the heat to be transferred and dispersed throughout the powder layer, as the localized heat diffuses through the material between pulses. However, only the surfaces of the particles rise in temperature rapidly during the spark heating. This temperature rise occurs over such a short period of time that there is not enough time for surface diffusion between the particles to take place, and thus grain growth is controlled.

Exemplary spark plasma sintering processes are described in U.S. Pat. Nos. 6,858,173; 6,875,374; and 6,905,649, which are fully incorporated herein by reference, as well as in the articles entitled "Wc-Co Consolidation by Means of Spark Plasma Sintering," by L. Girardini, M. Zadra, F. Casari and A. Molinari, Proceeding EURO PM2006, Belgium (October 2006); "Bulk Fine Grained and Nanostructured Binderless WC Consolidated by Spark Plasma Sintering," by L. Girardini, M. Zadra, F. Casari and A. Molinari, Proceeding EURO PM2007, France (October 2007); and "Design of Layered Metal-Ceramic FGMs Produced by Spark Plasma Sintering," by F. Casari, M. Zadra, L. Girardini and A. Molinari, AIP Conference Proceedings, Vol. 973, pp. 832-837 (2008); all three of which are fully incorporated herein by reference.

As explained above, the spark plasma HPHT sintering process forms a spark plasma in the localized areas between the ultra hard particles. In another embodiment of the invention, a process of pulsed electrical field assisted HPHT sintering is used to form an ultra hard cutting element. The procedure for pulsed electrical field assisted sintering is much the same as described above for spark plasma sintering. The difference between a pulsed electrical field assisted and a spark plasma sintering HPHT sintering process is that with a pulsed electrical field assisted HPHT sintering process, a spark plasma is not formed. If a spark plasma is not formed, Applicants expect the formed cutting element or compact to have the same benefits as one formed by a spark plasma sintering HPHT process. In the pulsed electrical field assisted process, the repeated high energy pulses applied to the ultra hard powder causes a high heating rate, even without the formation of a spark plasma.

Both pulsed electrical field assisted and spark plasma HPHT sintering are expected to improve the sintering process, so that successful sintering can take place at a lower temperature than without these processes. First, during conventional HPHT sintering, cobalt particles from the ultra hard powder mixture and/or from the substrate liquefy and move into the spaces between the ultra hard particles. Carbon dissolves into the liquid cobalt and then reprecipitates to form diamond-to-diamond bonding. The pulsed electrical field assisted and spark plasma HPHT sintering processes increase the rate of carbon dissolution into the liquid cobalt and speed up the reprecipitation of carbon from the liquid cobalt. As a result, diamond-to-diamond bonding is achieved more quickly than with conventional HPHT sintering processes, and the diamond particles can be successfully sintered at a lower temperature.

Second, these two processes also enhance the densification process during HPHT sintering. As described above, the pulsed heating causes the ultra hard particles to undergo plastic deformation and flow, leading to a denser ultra hard layer. Thus, the pulsed electrical field assisted and spark plasma HPHT sintering processes enhance the sintering process such that successful sintering can take place at a lower temperature.

Figure 4:
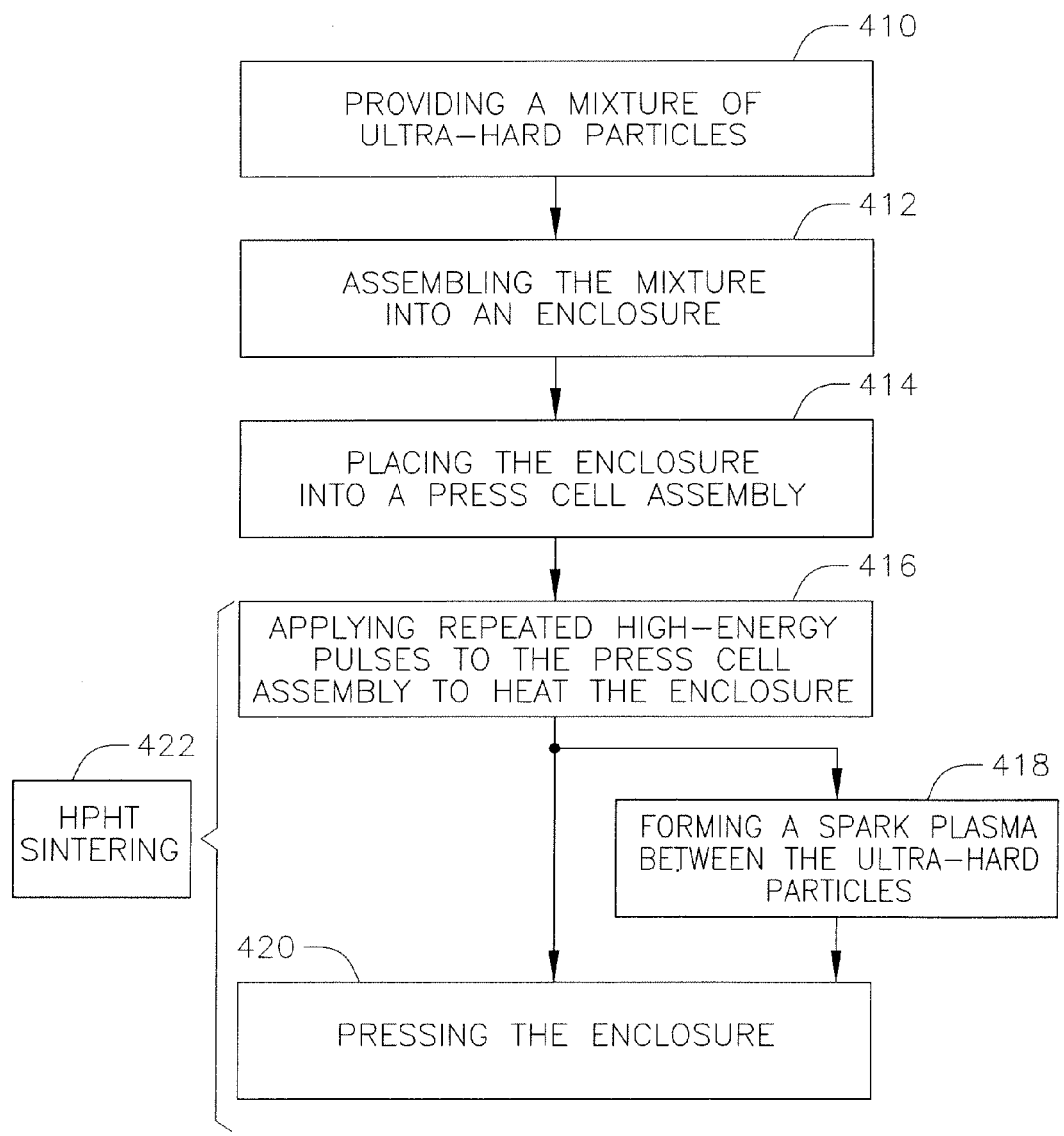
FIG. 4 is a flowchart depicting a method of forming a polycrystalline ultra-hard material according to an exemplary embodiment of the invention.

An exemplary embodiment of a method of forming a polycrystalline ultra-hard material is shown in FIG. 4. The method includes providing a mixture of ultra-hard particles 410, such as diamond or cubic boron nitride particles. As explained above, the ultra-hard particles may be mixed or coated with sintering aids or binders. The method then includes assembling the mixture into an enclosure 412, such as a refractory metal can. Optionally, a substrate is placed above the ultra-hard mixture in the can, so that the ultra-hard particles will be bonded to the substrate during sintering. The method also includes placing the enclosure into a press cell assembly 414. As shown in FIG. 1, the can enclosure 10 is surrounded by salt 12, placed in a graphite heater 14, and surrounded by a gasket material 16. The method then includes HPHT sintering 422, with the assistance of the repeated electric pulses. This includes applying repeated high-energy pulses 416, in order to heat the enclosure and the ultra-hard particles, as described above. In the case of spark plasma assisted sintering, the application of the repeated high-energy pulses includes forming a spark plasma between the ultra-hard particles 418. In the case of pulsed electrical field assisted sintering, no spark plasma is formed. Finally, the method also includes pressing the enclosure 420. The application of the pulses and the pressure is done simultaneously to sinter the ultra-hard particles in the enclosure.

Notably, in both pulsed electrical field assisted and spark plasma HPHT sintering, the temperatures to which the cutting element is exposed during sintering are lower than temperatures during conventional HPHT sintering. Reducing the maximum temperature reached during HPHT sintering also reduces the residual stresses caused by the difference in the coefficient of thermal expansion between the ultra hard material layer and the substrate. As a result, crack growth in the ultra-hard layer is reduced and the operating life of the ultra-hard cutting element is extended.

As this invention has been described herein by way of exemplary embodiments, many modifications and variations will be apparent to those skilled in the art. Accordingly, it is to be understood that the invention described herein may be embodied other than as specifically described herein.

What is claimed is:

1. A method of forming a polycrystalline ultra-hard material comprising:
    placing a mixture of ultra-hard particles into an enclosure;
    placing the enclosure into a press cell assembly having a heater;
    applying a repeated high-energy pulse to the heater to heat the ultra-hard particles; and
    pressing the enclosure at sufficient pressure to form a polycrystalline ultra-hard material, while applying said repeated high energy pulse, wherein pressing the enclosure at sufficient pressure comprises applying a pressure between about 5 to 7 GPa,
    wherein applying the repeated high-energy pulse comprises heating the enclosure to a temperature in a range of about 1,050° C. to about 2,000° C.

2. The method of claim 1, wherein the ultra-hard particles comprise diamond particles.

3. The method of claim 2, wherein the mixture of ultra-hard particles comprises cobalt mixed with the diamond particles.

4. The method of claim 1, wherein the ultra-hard particles comprise cubic boron nitride particles.

5. The method of claim 1, wherein placing the enclosure into the press cell assembly comprises placing the enclosure into a graphite heater and placing the graphite heater inside the press cell assembly.

6. The method of claim 1, further comprising placing a substrate adjacent the ultra-hard particles in the enclosure.

7. The method of claim 1, wherein applying the pulse comprises applying an electric pulse having an current density in the range of about 250 A/cm$^2$ to about 10,000 A/cm$^2$.

8. The method of claim 1, wherein the pulse has a duration of about 3 milliseconds.

9. The method of claim 1, wherein the enclosure is heated to a temperature less than about 2000° C.

10. The method of claim 1, wherein the polycrystalline ultra-hard material has a density ratio of over 99%.

11. The method of claim 1, wherein applying the repeated high-energy pulses comprises creating a spark plasma between the ultra-hard particles.

12. The method of claim 1, wherein applying the repeated high-energy pulses and pressing the enclosure take place over a duration between about 1 to about 30 minutes.

13. The method of claim 1, wherein the high-energy pulse comprises direct current.

14. The method of claim 1, wherein the high-energy pulse comprises alternating current.

15. The method of claim 1, wherein applying the repeated high-energy pulse comprises heating the enclosure to a temperature in a range of 1050° C. to 1450° C.

16. The method of claim 15, wherein the temperature is about 1050° C.

17. The method of claim 1, wherein applying the repeated high-energy pulse comprises heating the enclosure to a temperature below 1300° C.

18. A method of forming a polycrystalline diamond material comprising:
    placing a mixture of diamond particles into an enclosure;
    placing the enclosure into a press cell assembly having a heater;
    applying a repeated high-energy pulse to the heater to heat the diamond particles; and
    pressing the enclosure at sufficient pressure to form a polycrystalline diamond material, while applying said repeated high energy pulse, wherein pressing the enclosure at sufficient pressure comprises applying a pressure between about 5 to 7 GPa,
    wherein applying the repeated high-energy pulse comprises heating the enclosure to a temperature in a range of about 1,050° C. to about 2,000° C.

19. A method of forming a polycrystalline ultra-hard material comprising:
    placing a mixture of ultra-hard particles into an enclosure;
    placing the enclosure into a press cell assembly having a heater;
    applying a repeated high-energy pulse to the heater to heat the ultra-hard particles; and
    pressing the enclosure at sufficient pressure to form a polycrystalline ultra-hard material, wherein pressing the enclosure at sufficient pressure comprises applying a pressure between about 5 to 7 GPa, wherein the high-energy pulse comprises alternating current,
    wherein applying the repeated high-energy pulse comprises heating the enclosure to a temperature in a range of about 1,050° C. to about 2,000° C.

20. The method of claim 18, wherein applying the pulse comprises applying an electric pulse having an current density in the range of about 250 A/cm$^2$ to about 10,000 A/cm$^2$.

21. The method of claim 18, wherein the high-energy pulse comprises direct current.

22. The method of claim 18, wherein the high-energy pulse comprises alternating current.

23. The method of claim 18, wherein the pulse has a duration of about 3 milliseconds.

* * * * *

UNITED STATES PATENT AND TRADEMARK OFFICE
CERTIFICATE OF CORRECTION

PATENT NO. : 8,617,274 B2  Page 1 of 1
APPLICATION NO. : 12/499712
DATED : December 31, 2013
INVENTOR(S) : Guodong Zhan et al.

It is certified that error appears in the above-identified patent and that said Letters Patent is hereby corrected as shown below:

In the Claims

Column 7, Claim 7, line 51     Delete "an current"

Insert -- a current --

Column 8, Claim 20, line 50    Delete "an current"

Insert -- a current --

Signed and Sealed this
Fourth Day of August, 2015

Michelle K. Lee
*Director of the United States Patent and Trademark Office*